United States Patent
Vallet et al.

(10) Patent No.: US 11,774,023 B2
(45) Date of Patent: Oct. 3, 2023

(54) EQUIPMENT FOR CONNECTING FLUID CONVEYING PIPES

(71) Applicant: PARKER HANNIFIN EMEA SARL, Etoy (CH)

(72) Inventors: Jean-François Vallet, Janze (FR); Philippe Guillard, Saint-Gregoire (FR); Cédric Forgit, Crevin (FR)

(73) Assignee: PARKER HANNIFIN EMEA SARL, Etoy (CH)

( * ) Notice: Subject to any disclaimer, the term of this patent is extended or adjusted under 35 U.S.C. 154(b) by 169 days.

(21) Appl. No.: 17/292,043

(22) PCT Filed: Nov. 12, 2019

(86) PCT No.: PCT/EP2019/081019
§ 371 (c)(1),
(2) Date: May 7, 2021

(87) PCT Pub. No.: WO2020/099401
PCT Pub. Date: May 22, 2020

(65) Prior Publication Data
US 2021/0396337 A1    Dec. 23, 2021

(30) Foreign Application Priority Data
Nov. 12, 2018 (FR) ....................... 1860436

(51) Int. Cl.
*F16L 37/098* (2006.01)
*B25B 27/10* (2006.01)

(52) U.S. Cl.
CPC .......... *F16L 37/0982* (2013.01); *B25B 27/10* (2013.01)

(58) Field of Classification Search
CPC ....... F16L 37/0982; B25B 27/10; B25B 27/14
See application file for complete search history.

(56) References Cited

U.S. PATENT DOCUMENTS

| | | | | |
|---|---|---|---|---|
| 4,946,205 A | * | 8/1990 | Washizu | F16L 37/0987 285/82 |
| 5,187,851 A | * | 2/1993 | Klinger | F16L 37/0982 285/308 |

(Continued)

FOREIGN PATENT DOCUMENTS

| | | |
|---|---|---|
| EP | 1580478 | 9/2005 |
| FR | 3055940 | 3/2018 |

OTHER PUBLICATIONS

International Search Report and Written Opinion for corresponding International Patent Application No. PCT/EP2019/081019 dated Jan. 20, 2020.

*Primary Examiner* — James M Hewitt, II
(74) *Attorney, Agent, or Firm* — Renner, Otto, Boisselle & Sklar, LLP

(57) ABSTRACT

Connection equipment for a fluid transport circuit, the equipment comprising both a connection device (1) and also a disconnection tool (50) for disconnecting the device, the connection device comprising a tubular body (2) having at least one end segment (2.1) in which a tubular insert (100) is engaged in leaktight and removable manner, the insert being for connection to a duct (T) and including an external projection (104) extending into a housing of the body, the body including at least one a retaining tab (3) that is elastically deformable between a projecting position in which it projects into the housing, and a retracted position. The tool has two lifting ramps (55) and the body has two transverse passages (4) opening out both to the outside of the body and also into the housing on either side of the retaining tab in order to enable the lifting ramps to be inserted into the housing under the sides of the retaining tab (3) in order to bring the retaining tab into its retracted position and allow the tubular insert to be extracted.

6 Claims, 6 Drawing Sheets

(56) References Cited

U.S. PATENT DOCUMENTS 9,377,144 B2 * 6/2016 Ishii .................... F16L 37/0982
2016/0245441 A1 8/2016 Klein et al.

* cited by examiner

EQUIPMENT FOR CONNECTING FLUID CONVEYING PIPES

RELATED APPLICATIONS

This application is a national phase of International Application No. PCT/EP2019/081019 filed Nov. 12, 2019 and published in the French language, and claiming priority to French Application No. 1860436 filed Nov. 12, 2018.

The present invention relates to the field of transporting liquid or gaseous fluids, and more particularly to connection devices for connecting fluid transport ducts together, these ducts being defined in connection tubes and/or in circuit elements for issuing fluid or for receiving fluid.

STATE OF THE ART

Connection devices are known that comprise a tubular body having at least one end segment in which a tubular connection insert is engaged that is arranged to receive a duct end and to retain it in leaktight manner. The body includes at least one retaining tab that is pressed resiliently behind an external projection of the tubular insert in order to oppose extraction of the tubular insert. At least one annular sealing element extends between the tubular insert and the end segment of the body in order to provide sealing between them.

In general, such connection devices cannot be disconnected, so that failure of the tubular insert makes it necessary to replace the entire connection device.

OBJECT OF THE INVENTION

An object of the invention is to provide means for limiting the costs of maintaining connection devices of this type.

BRIEF SUMMARY OF THE INVENTION

To this end, the invention provides connection equipment for a fluid transport circuit, the equipment comprising both a connection device and also a disconnection tool for disconnecting the device, the connection device comprising a tubular body having at least one end segment in which a tubular insert is engaged in leaktight and removable manner, the insert being arranged to be connected to an external duct and including an external projection extending into a housing of the body, the body including at least one retaining tab that is elastically deformable between a projecting position in which it projects into the housing in order to be engaged behind the external projection so as to oppose extraction of the tubular insert from the body, and a retracted position in which it is disengaged from the external projection. The tool has two lifting ramps and the body has two transverse passages opening out both to the outside of the body and also into the housing on either side of the retaining tab in order to enable the lifting ramps to be inserted into the housing under the sides of the retaining tab in order to bring the retaining tab into its retracted position and allow the tubular insert to be extracted.

Thus, the lifting ramps enable the retaining tab to be lifted over its entire width through a predetermined distance that is just sufficient to separate it from the external projection of the insert, without excessively deforming the retaining tab and without twisting it.

In a particular embodiment, the body has two diametrically opposite retaining tabs and each retaining tab has two respective passages facing it and opening out into the housing, and the tool has four lifting ramps.

In particular manner, the tool comprises two identical portions, each portion having two lateral projections with the lifting ramps being arranged at the ends of the projections.

Advantageously, the two portions of the tool are connected together by a flexible strip.

Other characteristics and advantages of the invention appear on reading the following description of particular, nonlimiting embodiments of the invention.

BRIEF DESCRIPTION OF THE FIGURES

Reference is made to the accompanying drawings, in which.

DETAILED DESCRIPTION OF THE INVENTION

Figure 1:
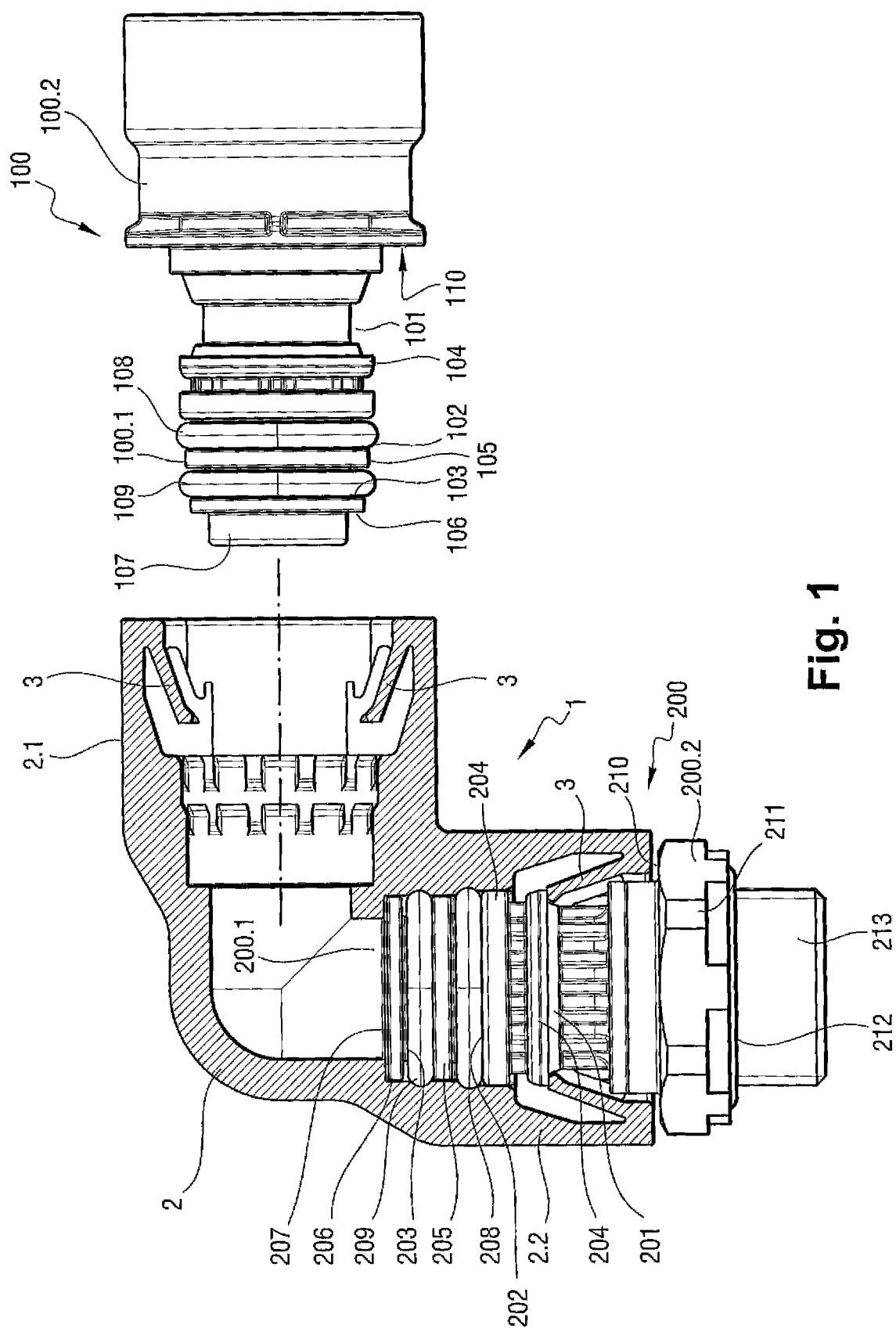
FIG. 1 is a longitudinal section view of a partially-assembled connection device of the invention.
Figure 2:
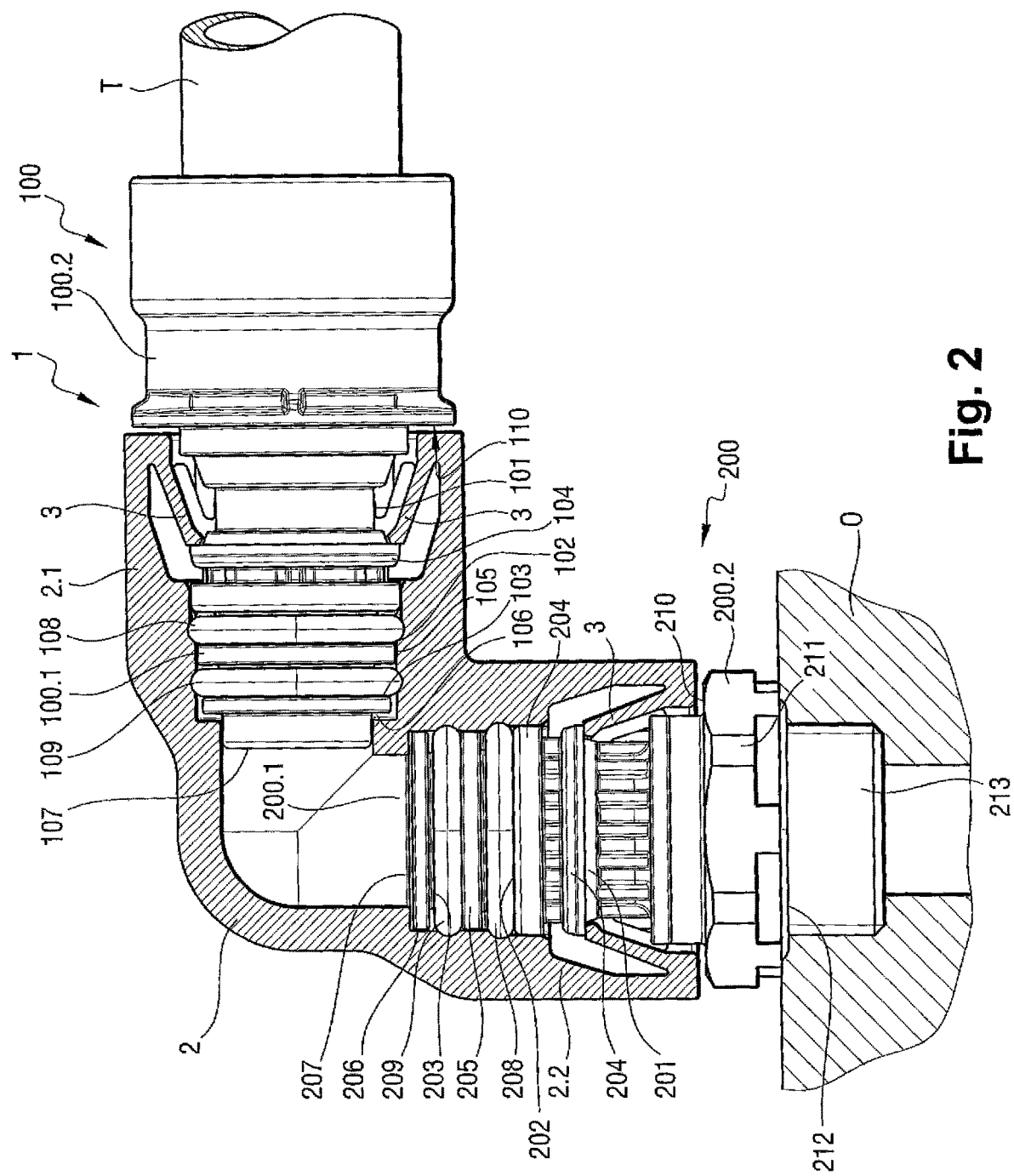
FIG. 2 is a view analogous to the view of FIG. 1 of the connection device once assembled.
Figure 3:
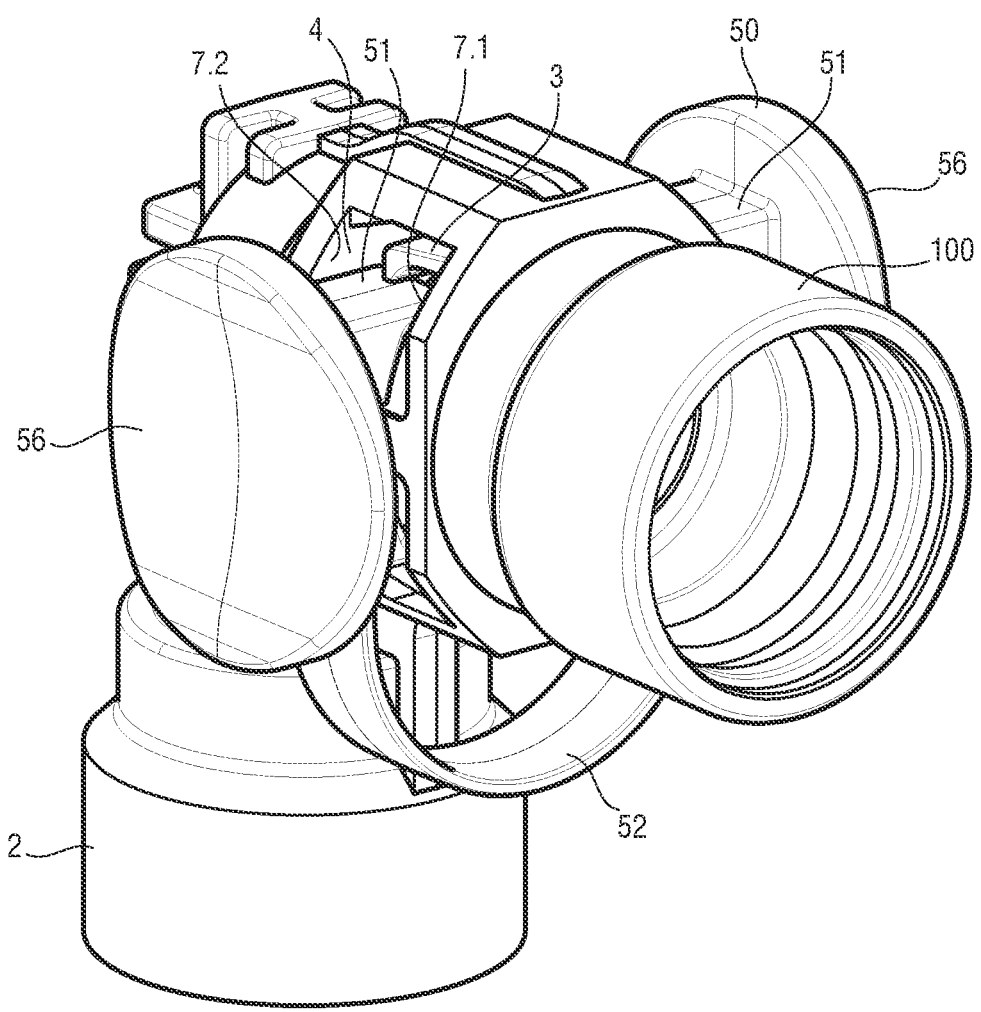
FIG. 3 is a perspective view of a connection device after inserting a tool in a particular embodiment of the invention.
Figure 4:
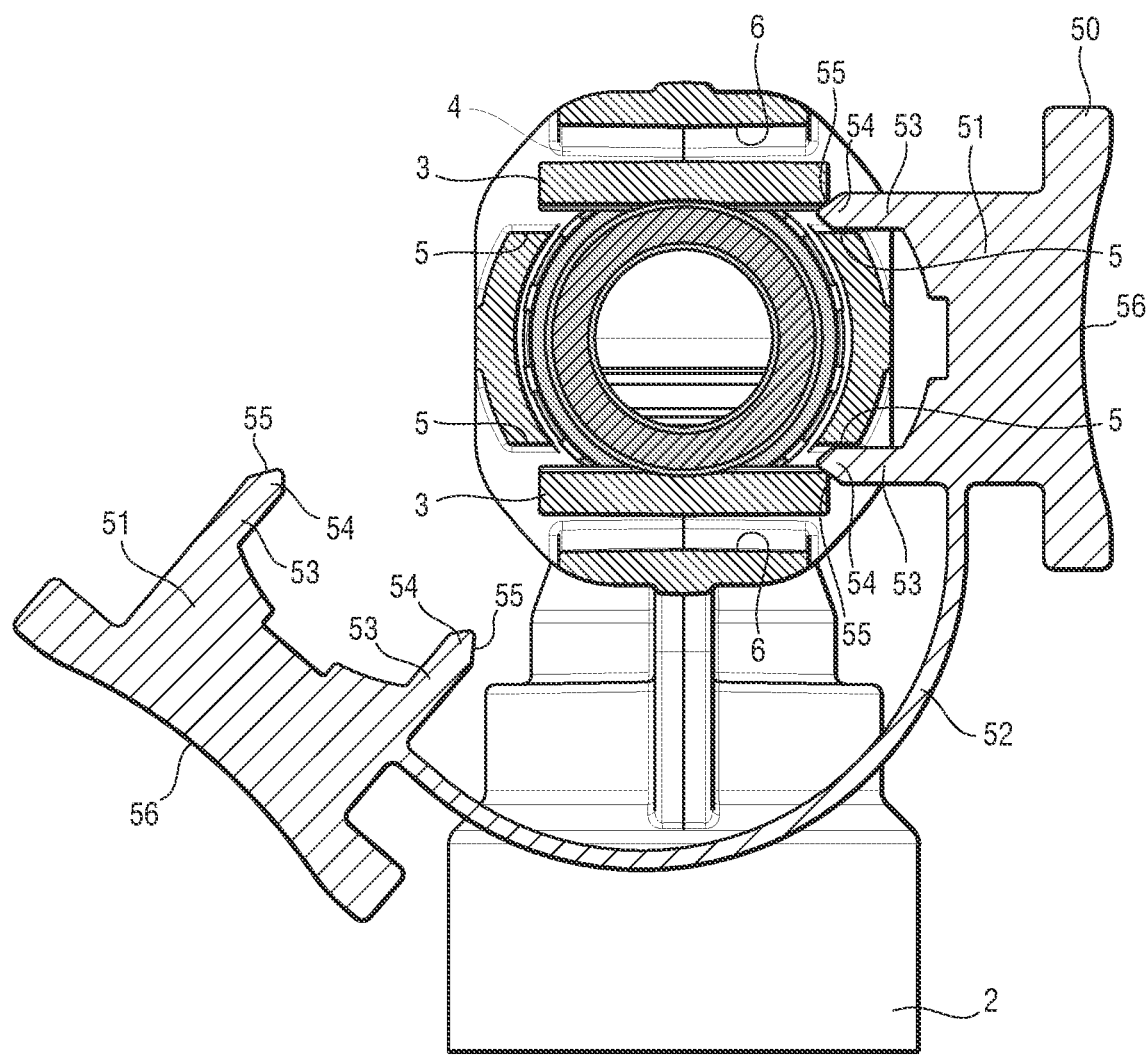
FIG. 4 is a cross-section view of the connection device showing the lifting ramps of the tool after it has been inserted partially.
Figure 5:
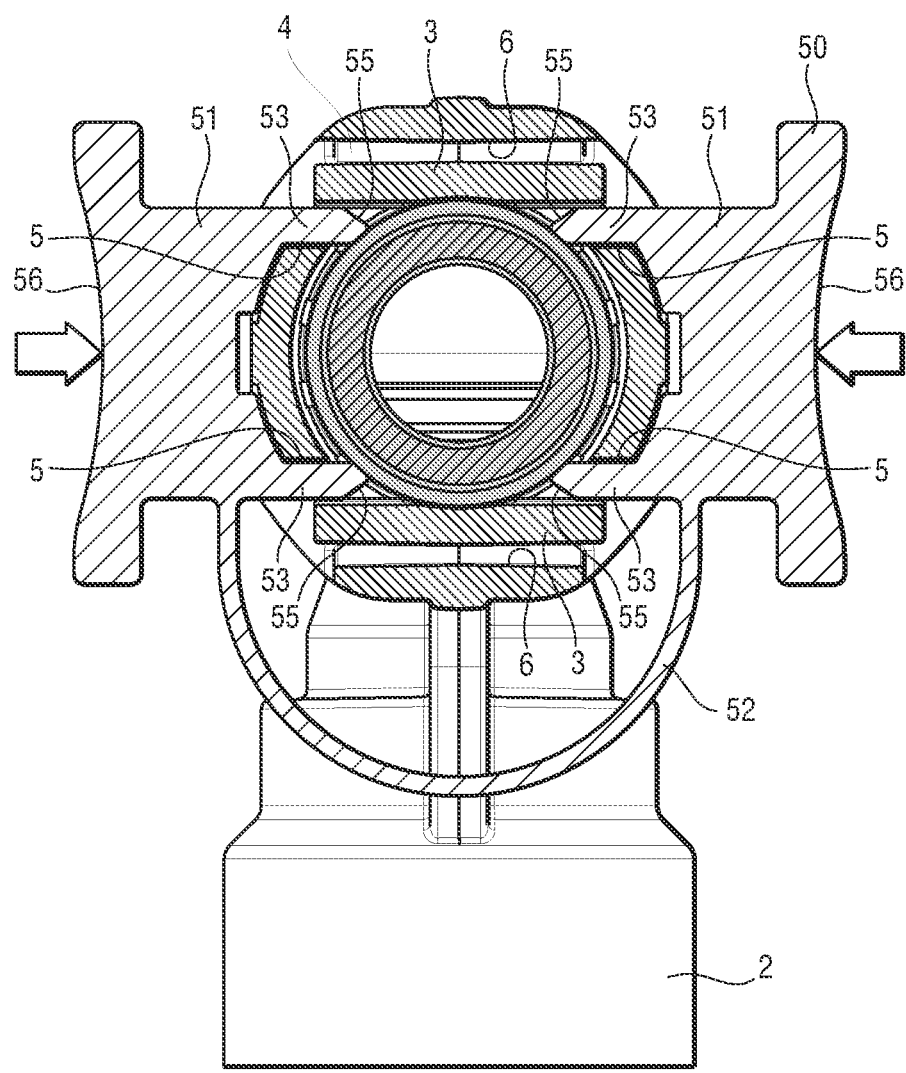
FIG. 5 is a view analogous to the view of FIG. 4, once insertion is almost complete.
Figure 6:
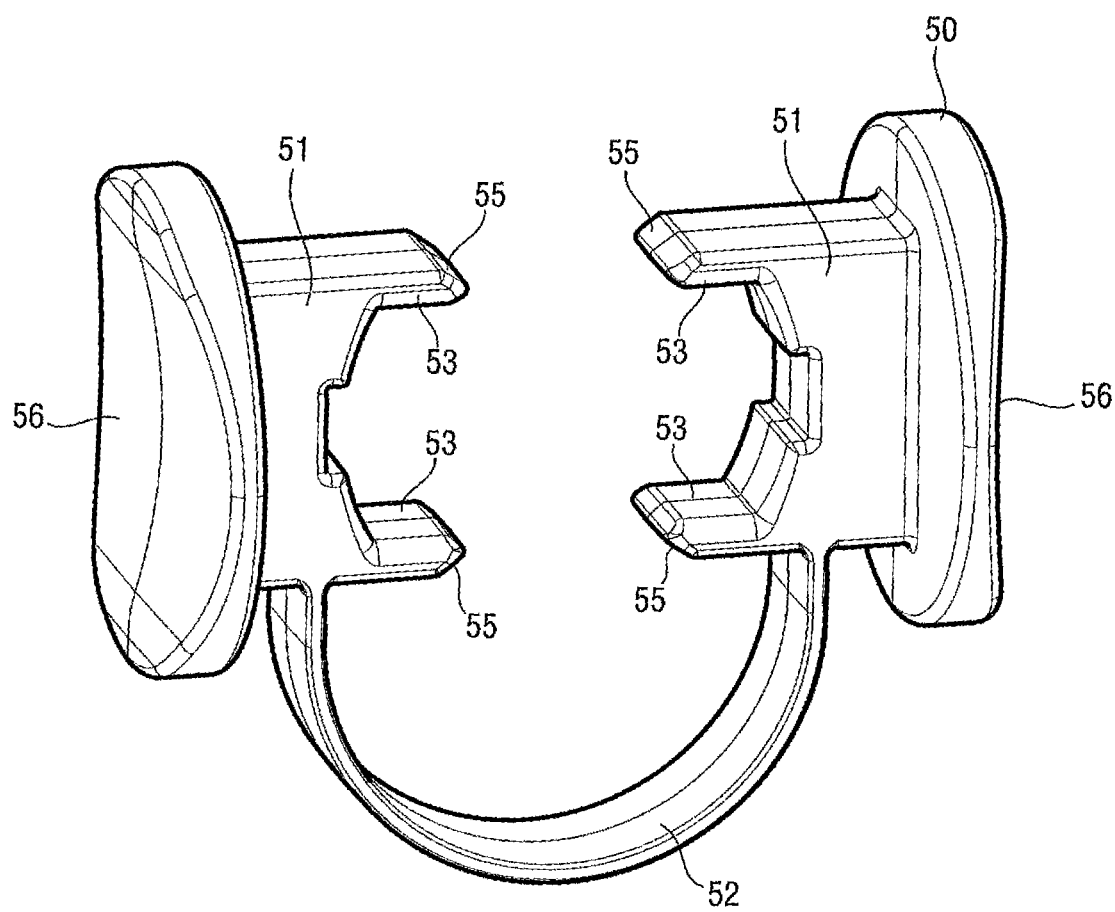
FIG. 6 is a perspective view of the tool on its own.

The invention as described herein in application to connecting a tube T forming a first fluid transport duct to a second fluid transport duct formed in a member O for emitting or receiving fluid (see FIG. 2).

With reference to FIGS. 1 to 6, the connection assembly comprises a connection device given overall reference 1 and a tool given overall reference 50 for disconnecting the device.

The connection device comprises a tubular body 2 having both a first end segment 2.1 in which an insert 100 is engaged in removable and leaktight manner, the insert being arranged to be connected to one end of the tube T, and also a second end segment 2.2 in which an insert 200 is engaged in removable and leaktight manner, the insert being arranged to be connected to the member O.

The insert 100 is in the form of a tube subdivided into a first connection segment 100.1 for connection to the first end segment 2.1 of the body 2 and a second connection segment 100.2 for connection to the tube T.

The segment 100.1 is provided with annular grooves 101, 102, and 103. The groove 101 is defined between the segment 100.2 and a collar 104, the groove 102 is defined between the collar 104 and a collar 105, and the groove 103 is defined between the collar 105 and a collar 106 from which there projects axially a free terminal portion 107 of the segment 100.1. The groove 102 receives a sealing ring 108 and the groove 103 receives a sealing ring 109. The sealing rings 108 and 109 are for providing sealing between the segment 100.1 and the body 2.

The segment 100.2 extends from the end segment 2.1 with which it is in abutment against a terminal face thereof via a shoulder 110, and it is provided internally, in conventional manner, with a quick connection member comprising both a resilient retention element for retaining the end of the tube T inserted into the insert 100 and also at least one sealing ring for providing sealing between the end of the tube T and the insert 100.

The insert 200 is in the form of a tube subdivided into a first connection segment 200.1 for connection to the second end segment 2.2 of the body 2 and a second connection segment 200.2 for connection to the member O.

The segment 200.1 is identical to the segment 100.1 and it thus comprises: annular grooves 201, 202, and 203; collars 204, 205, and 206; and a free terminal portion 207. The grooves 202 and 203 receive sealing rings 208 and 209.

The segment 200.2 projects from the end segment 2.2 with which it is in abutment against a terminal face thereof via a shoulder 210 and a portion 211 of hexagonal outside section that has one side that forms the shoulder 210, and an opposite side that is provided with an annular groove that receives a sealing ring 212 and that extends around a threaded final segment 213 that projects axially in order to be engaged in a tapped end segment of the duct of the member O.

Each of the segments 2.1 and 2.2 is provided with two retaining tabs 3 that are diametrically opposite each other. Each retaining tab 3 has a first end secured to the body 2 beside the outlet of the terminal face of the segment 2.1, 2.2 in question, and an opposite second end that is free and closer to the central axis of the segment 2.1, 2.2 in question than is the first end. The retaining tabs 3 are elastically deformable between a rest state in which their free ends are in a position projecting into a housing in the body so as to define a through section that is smaller than the diameter of the collar 104, 204, and a deformed state in which their free ends are in a retracted position in which they define a through section that is greater than the diameter of the collar 104, 204.

Thus, when the segment 100.1, 200.1 of the insert 100, 200 is engaged in the end segment 2.1, 2.2, the free ends of the retaining tabs 3 rub against the collar 106, 206, against the sealing ring 109, 209, against the collar 105, 205, against the sealing ring 108, 208, and then against the collar 104, 204 prior to dropping into the groove 101, 201 that extends into the housing. It can be understood that in the event of an attempt to extract the insert 100, 200 from the body 2, the free ends of the retaining tabs 3 come into abutment against the collar 104, 204 that forms a projection.

In order to withdraw the insert 100, 200 without degrading either the insert or the body 2, it is possible to use the tool 50 that, for this purpose, comprises two identical rigid portions 51 facing each other and connected together by a flexible strip 52 that is substantially semicircular in shape. The term "rigid" is used herein to mean that the portions 51 are not subjected to any deformation while the tool 50 is being used for withdrawing the insert 100, 200 from the body 2.

Each portion 51 has two lateral projections 53 that are substantially parallel and that have main faces facing each other. The lateral projections 53 are symmetrical, each having a free end 54 that is arranged to enable the sides of a retaining tab 3 to be lifted. In this example, each free end 54 is chamfered so as to form lifting ramps 55 for lifting the sides of the retaining tabs 3.

In order to be able to access the retaining tabs 3 from outside the body 2, each retaining tab 3 extends in a passage 4 that extends transversely in the segment 2.1, 2.2 in order to open out into the housing. The passage 4 has a side wall 7.1 beside the terminal face of the segment 2.1, 2.2, a terminal wall 7.2 spaced apart by a distance perceptibly greater than the width of the lateral projections 53, a bottom wall 5 extending as far as the housing into which an outer portion of the collar 104, 204 projects, and a top wall 6 allowing the retaining tab 3 to deform towards its deformed state. The walls 5 and 6 are parallel to each other, and the passage 4 is open to the outside of the body.

Each passage 4 thus opens out firstly to the outside of the body and secondly into the housing on a respective side of the retaining tab 3 so as to enable the lateral projections 53 to be inserted between the bottom wall 5 and the sides of the retaining tab 3 the purpose of lifting the retaining tab across its width in order to separate the retaining tab 3 from the projection, thereby enabling the insert 100, 200 to be extracted. More exactly, the retaining tab 3 is lifted by inserting the lifting ramps 55 under respective sides of said retaining tab.

Elastic deformation of the flexible strip 52 enables the portions 51 of the tool 50 to be arranged on opposite sides of the segment 2.1, 2.2, and more particularly to arrange the lateral projections 53 so that they face the passages 4. The flexible strip 52 is of a shape such that, when at rest, the lifting ramps 55 of the lateral projections 53 exert a small amount of pressure under each of the sides of the retaining tabs 3. The flexible strip 52 may be made of plastics material, of metal, or of any other material. In this example, the tool 50 is made by injection molding plastics material.

The lifting ramps 55 are then inserted under the retaining tab 3 by exerting pressure on the outside faces 56 of the portions 51, e.g. by squeezing them, tending to cause said portions to move simultaneously towards the center of the segment 2.1, 2.2. In this example, the outside faces 56 of the portions 51 are concave in shape in order to facilitate squeezing between the fingers of a user.

Also, since the passages 4 are spaced apart by a distance that is a little less than the distance between the two lateral projections 53 of the portions 51, the bottom walls 5 guide the lateral projections 53 in said passages 4. The lifting ramps 55 arranged at the ends of the lateral projections 53 then lift the two retaining tabs 3 perceptibly by the same amount.

When the lateral projections 53 come into contact with the collar 104, the lifting ramps 55 are maximally inserted. The lifting ramps 55 are then completely covered by the retaining tabs 3, such that said retaining tabs are lifted by an amount that is substantially equal to the thickness of the lifting ramps 55.

The portions 51 of the tool 50 are of stiffness such that the retaining tabs 3 are lifted without deforming the lateral projections 53, and in particular without deforming the lifting ramps 55.

It should be observed that when pressure ceases to be exerted on the outside faces 56, the portions 51 of the tool 50 tend to move away from the center of the segment 2.1, 2.2 under the action of the flexible strip 52 so as to end up reaching the position that was occupied prior to applying said pressure, thereby making it easier to withdraw the tool.

Naturally, the invention is not limited to the embodiments described and covers any variant coming within the ambit of the invention as defined by the claims.

In particular, the body could have only one retaining tab (with each of the portions 51 of the tool then having only one lateral projection 53) or it could be arranged to receive only one insert.

The portions 51 of the tools need not be secured to each other.

The inserts may be identical or otherwise.

The means for connecting the inserts to tubes or to circuit elements may be of any kind.

The invention claimed is:

1. Connection equipment for a fluid transport circuit, the connection equipment comprising both a connection device and also a disconnection tool for disconnecting the device, the connection device comprising a tubular body having at least one end segment in which a tubular insert is engaged in leaktight and removable manner, the insert being arranged to be connected to an external duct and including an external projection extending into a housing of the body, the body including at least one retaining tab that is elastically deformable between a projecting position in which it projects into the housing in order to be engaged behind the external projection so as to oppose extraction of the tubular insert from the body, and a retracted position in which it is disengaged from the external projection, the connection equipment being characterized in that the tool has two rigid lifting ramps and the body has two transverse passages opening out both to the outside of the body and also into the housing on either side of the retaining tab, the two rigid lifting ramps being arranged to be inserted into the housing respectively under one of the sides of the retaining tab and to bring the retaining tab into its retracted position without the two rigid lifting ramps being subjected to any deformation in order to allow the tubular insert to be extracted.

2. The connection equipment according to claim 1, wherein the body has two diametrically opposite retaining tabs and each of the tabs has two respective passages facing it and opening out into the housing, and the tool has four lifting ramps.

3. The connection equipment according to claim 2, wherein the tool comprises two identical portions, each portion having two lateral projections with the lifting ramps being arranged at the ends of the projections.

4. The connection equipment according to claim 3, wherein the two portions of the tool are connected together by a flexible strip.

5. The connection equipment according to claim 1, including at least one annular sealing element extending between the tubular insert and the end segment of the body, the annular sealing element being carried by an end segment of the insert.

6. The connection equipment according to claim 1, wherein the tubular insert is provided internally with a quick connection member including a resilient retaining element for retaining the external duct inserted into the insert.

* * * * *